United States Patent [19]
Saito

[11] Patent Number: 5,871,229
[45] Date of Patent: Feb. 16, 1999

[54] AUTOMOBILE AIRBAG DEVICE

[75] Inventor: Kazuhiro Saito, Saitama, Japan

[73] Assignee: Kansei Corporation

[21] Appl. No.: 864,561

[22] Filed: May 28, 1997

[30] Foreign Application Priority Data

Jun. 10, 1996 [JP] Japan .................................. 8-147532

[51] Int. Cl.[6] .................................................. B60R 21/16
[52] U.S. Cl. ........................................ 280/732; 280/728.3
[58] Field of Search ............................. 280/728.2, 728.3, 280/731, 732

[56] References Cited

U.S. PATENT DOCUMENTS

| | | | |
|---|---|---|---|
| 5,393,088 | 2/1995 | Bauer et al. | 280/728 |
| 5,447,327 | 9/1995 | Jarboe et al. | 280/728.3 |
| 5,487,558 | 1/1996 | Ball et al. | 280/728.3 |
| 5,522,616 | 6/1996 | Bauer et al. | 280/728.3 |
| 5,564,731 | 10/1996 | Gallagher et al. | 280/728.3 |

FOREIGN PATENT DOCUMENTS

| | | |
|---|---|---|
| 2250295 | 6/1992 | United Kingdom . |
| 2265338 | 9/1993 | United Kingdom . |
| 2270886 | 3/1994 | United Kingdom . |
| 2287226 | 9/1995 | United Kingdom . |
| 2287677 | 9/1995 | United Kingdom . |

*Primary Examiner*—Paul N. Dickson
*Attorney, Agent, or Firm*—Morrison Law Firm

[57] ABSTRACT

An automobile airbag device having a lid in an instrument panel body, where the instrument panel body faces an airbag pop-out area, the lid for airbag expansion is formed into the instrument panel body by a hinge section and a splitting section of thinned thicknesses. There is an opening formed by breaking of the splitting section and swinging of the lid about the hinge section where an airbag which expands from airbag device body can push through around the opening. There is a reinforcement bracket which is proximate to the inner side of the lid.

3 Claims, 3 Drawing Sheets

AUTOMOBILE AIRBAG DEVICE

BACKGROUND OF THE INVENTION

The present invention relates to an automobile airbag device. In particular, the present invention relates to an airbag device enclosure lid for an airbag body placed at a specified location behind an instrument panel body. The instrument panel body includes an airbag pop-out area with a lid for airbag expansion.

Referring to FIG. 3, there is shown an example of the prior art which is the type described in Japanese laid open patent number 63-101255. As can be seen by the figure, there is an instrument panel 1 which includes a base 11 of synthetic resin having an airbag pop-out opening 2. A middle layer 12 is formed from a foam body. Middle layer 12 has a coating 13 on its surface. These three layers that include base 11, middle layer 12, and coating 13, are constructed into a single body.

Airbag pop-out opening 2 has an approximate rectangular shape, having three sides of its perimeter formed in base 11 by channel areas 11a having a thinned thickness and a remaining side 11c. Airbag pop-out opening 2 has a projection 11b, formed in base 11, which lies along each side of thinned area 11a and which projects in a direction towards middle layer 12. Airbag pop-out opening 2 also has a woven cloth 14 inside middle layer 12 and which covers thinned area 11c.

Behind instrument panel 1 opposite to airbag pop-out opening 2, there is placed an airbag device body (not shown). When the airbag is expanded by an inflator which is housed inside the airbag device body, the expansion pressure splits each of the frangible sides of thinned areas 11a. Projections 11b on thinned areas 11a ruptures through middle layer 12 and coating 13, thereby allowing expanding airbag to emerge from behind instrument panel 1. Referring to the lower part of the figure, the airbag expands, using thinned area 11c and woven cloth 14 as a hinge. Airbag pop-out opening 2 opens up, and the airbag expands into the interior of the automobile.

The number of types of materials and the number of production steps needed to make the conventional airbag device in the instrument panel are many because, in the prior art, the cross-sectional structure of instrument panel 1 is made from a combination of three layers. As a result, there is a problem with high cost.

Woven cloth 14 is placed inside middle layer 12 as a reinforcement for thinned area 11c. When foaming material is injected and molded into middle layer 12, the foam expansion ratio is likely to be uneven. Thus there is a problem due to the unevenness of adhesive strength of woven cloth 14 inside middle layer 12.

There is concern for a problem thought inherent to instrument panel bodies formed from a single layer. That is, the problem of deformation of any structures formed from thinning of the single layer. A lid that is formed behind the instrument panel body can be deformed by an impact to or by pressure on the surface of the instrument panel, thereby distorting the lid.

OBJECTS AND SUMMARY OF THE INVENTION

It is an object of the present invention to overcome the limitations of the prior art.

It is an object of the present invention to provide a lid which opens in a stable and even manner. Even if there is weight put on the instrument panel body from the surface, deformation is prevented.

A further object of the present invention is to provide an automobile airbag device which has good production capabilities and is inexpensive.

In order to achieve the above objects, an embodiment of the present invention comprises an automobile airbag device wherein an airbag device body is placed at a specified location behind an instrument panel body which is made from a single layer of a synthetic resin, behind the instrument panel body and where the instrument panel body faces an airbag pop-out area of the airbag device body, a lid for airbag expansion is formed into a panel by a hinge groove and splitting groove of thinned thicknesses; when the hinged panel is formed by the fracture of the splitting groove, there is thus formed an opening where an airbag which expands from the airbag device body can push through; and around the opening is a reinforcement bracket which abuts the inner side of the lid.

As described above, instrument panels made from a single layer have the potential problem of deformation of any grooves formed from the single layer. However, by the configuration described above, in the automobile airbag device with a lid panel of the present invention, deformation due to pushing or impact from the surface can be prevented by a reinforcement bracket. The opening of the reinforcement bracket also plays a role as a guide for the airbag while the airbag is expanding. The airbag abuts against the inner surface of the lid at its normal position before deployment.

Because the instrument panel body is a single layer of a synthetic resin, the splitting groove and the hinge groove can be molded at the same time with the manufacture of the instrument panel in one process step by, for example, injection molding, The molding accuracy is therefore increased from that of the prior art.

The above, and other objects, features, and advantages of the present invention will become apparent from the following description read in conjunction with the accompanying drawings, in which like reference numerals designate the same elements.

Briefly stated, an automobile airbag device having a lid in an instrument panel body, where the instrument panel body faces an airbag pop-out area, the lid for airbag expansion is formed into the instrument panel body by a hinge section and a splitting section of thinned thicknesses. There is an opening formed by breaking of the splitting section and swinging of the lid about the hinge section where an airbag which expands from airbag device body can push through around the opening. There is a reinforcement bracket which is proximate to the inner side of the lid.

According to an embodiment of the present invention, an automobile airbag device on an instrument panel body, said airbag device comprises a lid, the lid including a perimeter border structure connecting the lid to the instrument panel body, the perimeter border structure having a hinge section and a frangible section, the lid swingable about the hinge section upon breaking of the frangible section, a reinforcement bracket exteriorly encircling the perimeter border structure, and an airbag device body mounted proximate to the reinforcement bracket and operable to open the lid on deployment of an airbag from the airbag device body, through an opening defined by the reinforcement bracket, the airbag breaking the frangible section on deployment so that the lid swings about the hinge section.

The above, and other objects, features and advantages of the present invention will become apparent from the following description read in conjunction with the accompanying drawings, in which like reference numerals designate the same elements.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
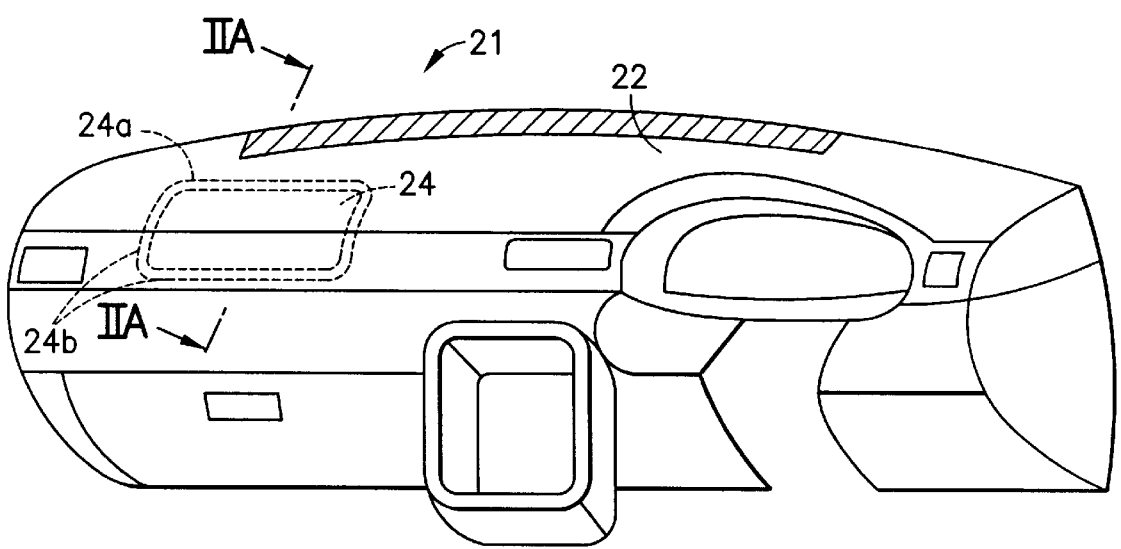
FIG. 1 is a perspective view of an automobile airbag device according to an embodiment of the present invention.
Figure 2A:
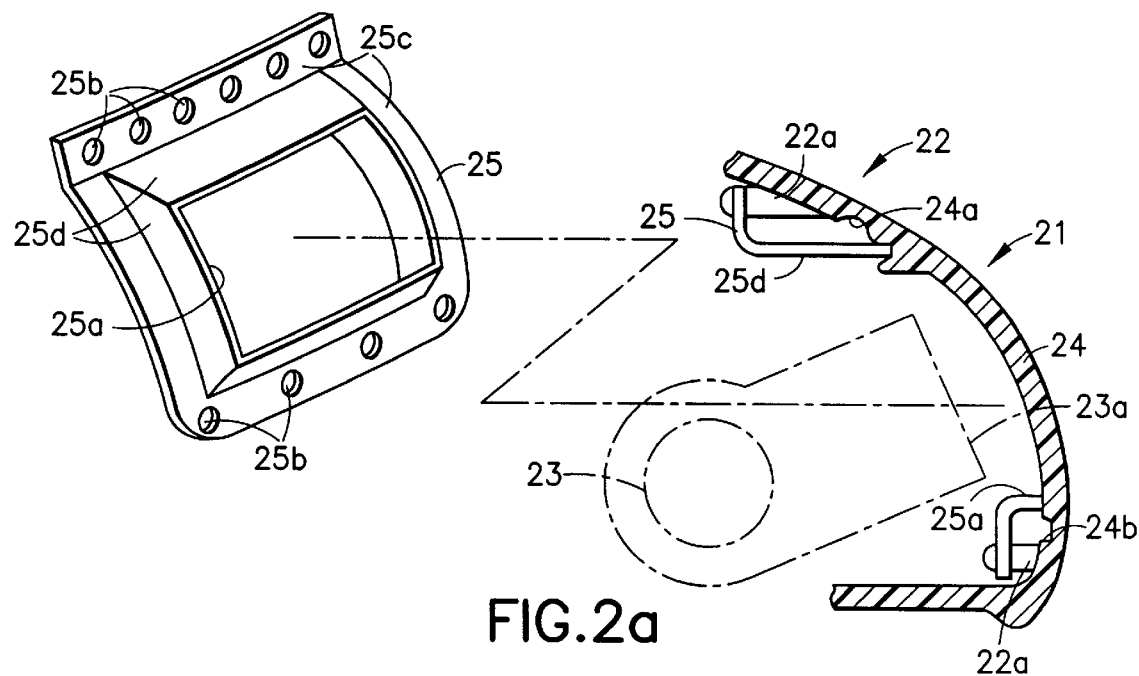
FIG. 2a is a descriptive drawing which shows a cross-sectional view along the line IIA—IIA of FIG. 1 and shows the reinforcement bracket anchored to the lid.
Figure 2B:
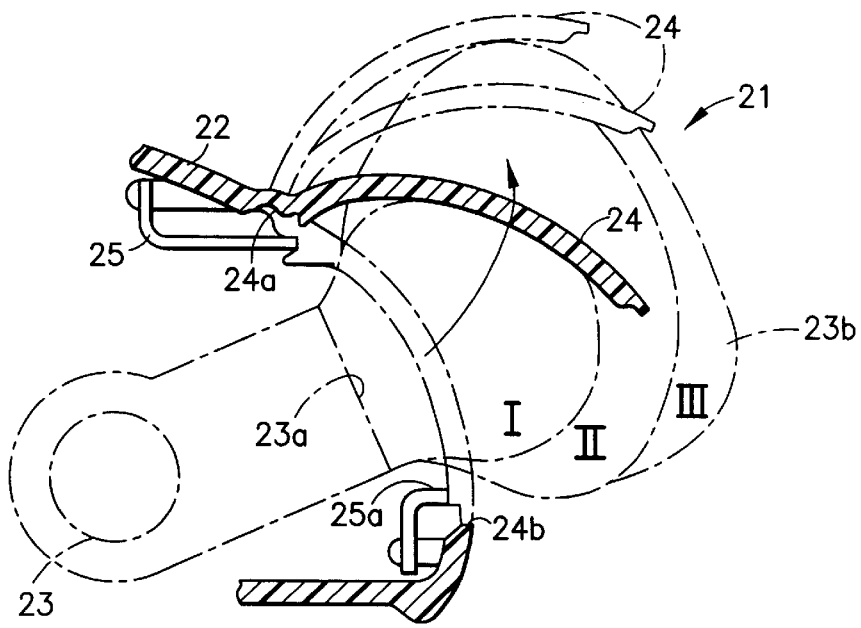
FIG. 2b is a descriptive drawing of the lid in its opened state.
Figure 3:
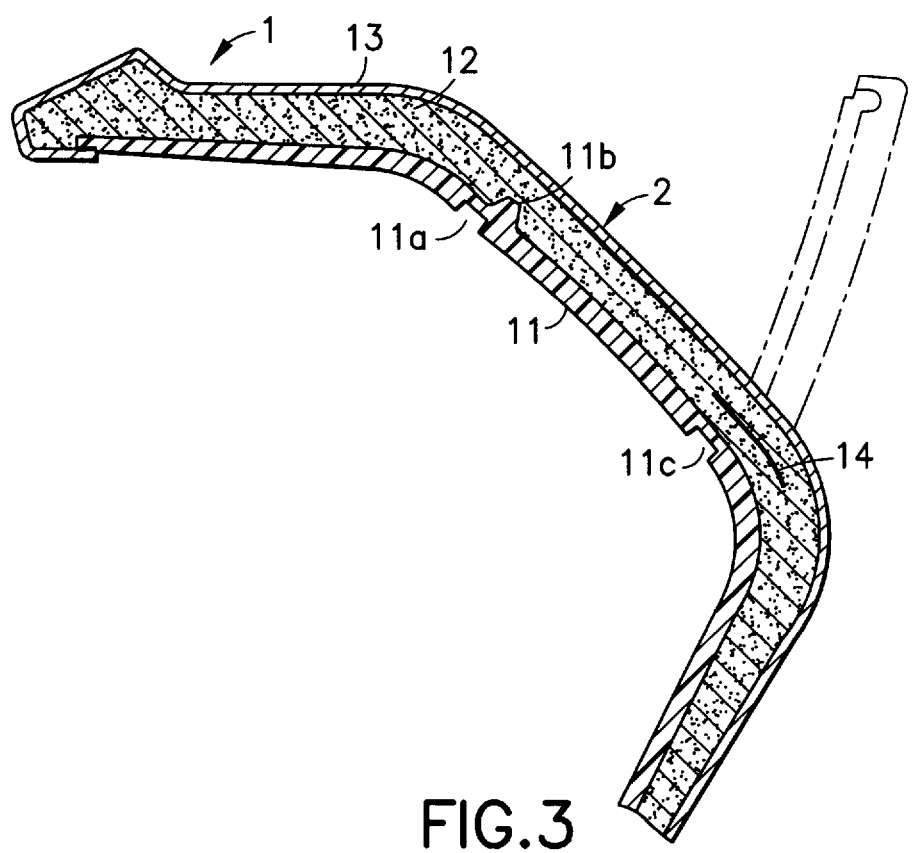
FIG. 3 is a cross-sectional view of the instrument panel of the prior art.

Referring to FIGS. 1, 2a and 2b, the present invention of an automobile airbag device will be explained.

Referring to FIG. 1, the structure will be described. There is shown an automobile airbag device 21. An instrument panel body 22 is molded as a single layer of synthetic resin. A lid 24 for the deploying by expansion of an airbag is placed at a specified location on the back side of instrument panel 22 on the passenger side. Lid 24 is defined on one side by hinge groove 24a and on three sides by frangible splitting groove 24b and is formed to be approximately rectangular. The shape of lid 24 is effective to deploy an airbag to protect the to form a lid that swings about the hinge groove. It can be seen that the hinge groove and the frangible groove form a hinge section and a frangible section that together form, in turn, a perimeter portion that connects the lid to the instrument panel body.

Referring to FIG. 2(a), splitting groove 24b forms three sides of lid 24 and is an area of thinned thickness. Splitting groove 24b has an approximate U-shaped frontal view. Hinge groove 24a which forms the remaining side is a thinned area similar to splitting groove 24b. Hinge groove is not frangible and serves as the hinge for lid 24 formed when frangible slitting groove 24b is split apart.

Near the outside of each of hinge groove 24a and splitting groove 24b of lid 24, a plurality of bosses 22a project out. A reinforcement bracket 25 is joined to boss 22a.

Bracket 25 having a base 25c is made from the same synthetic resin as instrument panel body 22. A plurality of fastening holes 25b are placed on base 25c. A flange 25d rises in a pyramidal form from base 25c towards the back of lid 24. The top of flange 25d is formed into an opening 25a which is an approximate rectangle and which abuts the inner side of lid 24.

Referring to FIG. 2b, the operation will be explained.

By the operation of airbag device body 23, when an airbag 23b is opened from a pop-out area 23a, airbag 23b expands and places pressure on lid 24. Consequently, splitting groove 24b on lid 24 is split in step I. Airbag 23b expands further and pushes open lid 24 in step II. Airbag 23b expands further and using hinge groove 24a as a hinge, lid 24 is opened and airbag 23b expands into the interior of the automobile in step III.

Base 25c of reinforcement bracket 25 is joined to boss 22a. Because opening 25a of bracket 25 is positioned on the inside of hinge groove 24a and splitting groove 24b, the opened airbag 23b is guided by flange 25d of bracket 25 towards opening 25a. Airbag 23b therefore accurately pushes on lid 24 from opening 25a.

Instrument panel body 22, which is made as a single layer from a synthetic resin, can be injection molded using any suitable material such as, for example, a compound resin material such as polypropylene resin mixed with an additive which will improve the stretching strength, low-temperature impact, bending strength, heat resistance, or the like.

The present invention according to an embodiment is an automobile airbag device wherein: there is an opening where an airbag which expands from the airbag device body can push through; around the opening, there is a reinforcement bracket which abuts the inner side of the lid. Even when there is an impact or pushing on the surface of automobile airbag device, because the reinforcement bracket abuts against it, deformation is prevented. The opening of the reinforcement bracket acts as a guide for the expanding airbag, and pressure can be applied accurately to the back of lid so that the lid can open properly.

Furthermore, because the lid is part of a single layer object together with the instrument panel body, the splitting groove and the hinge groove can be molded at the same time with one injection molding. As a result, the molding accuracy is good. Further, as a result, the lid opens with increased accuracy and stablility.

Another advantage is that, because the instrument panel body and lid is one body and all molded from one material, future recovery of material by recycling is facilitated. Additionally, because the groove structure is on the inside surface of the instrument panel, away from the car interior of the automobile occupants, the placement of the airbag device is hidden from view. Thus, theft is deterred because the position of the airbag is not obvious be visual inspection.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment (s) without materially departing from the novel teachings and advantages of this invention. Accordingly, all such modifications are intended to be included within the scope of this invention as defined in the following claims, In the claims, means-plus-function clauses are intended to cover the structures described herein as performing the recited function and not only structural equivalents but also equivalent structures, This although a nail and screw may not be structural equivalents in that a nail relies entirely on friction between a wooden part and a cylindrical surface whereas a screw's helical surface positively engages the wooden part in the environment of fastening wooden parts, a nail and a screw may be equivalent structures.

What is claimed is:

1. An automobile airbag device on an instrument panel body, said airbag device comprising:

an instrument panel body, said instrument panel body being formed of a single layer of synthetic resin;

a lid, said lid including a perimeter border structure connecting said lid to said instrument panel body;

said perimeter border structure having a hinge section and a frangible section, said lid being swingable about said hinge section upon breaking of said frangible section, both said hinge section and said frangible section being grooves formed on a surface of said instrument panel body;

a reinforcement bracket exteriorly encircling said perimeter border structure, said reinforcement bracket including a generally rectangular flange, the top of said flange abutting the inner side of said lid inwardly of said perimeter border structure; and an airbag device body mounted proximate to said reinforcement bracket and operable to open said lid on deployment of an airbag from said airbag device body, through an opening defined by said reinforcement bracket, said airbag breaking said frangible section on deployment so that said lid swings about said hinge section.

2. An automobile airbag device of claim 1, wherein said surface is an opposite surface to an interior occupant surface.

3. An automobile airbag device of claim 1, wherein said flange is effective to guide passage of said airbag through an opening in said instrument panel body formed by said lid swinging about said hinge section.

* * * * *